United States Patent
Machida et al.

(10) Patent No.: US 9,536,675 B2
(45) Date of Patent: Jan. 3, 2017

(54) POLYMERIZATION LIQUID, CONDUCTIVE POLYMER FILM OBTAINED FROM POLYMERIZATION LIQUID, AND SOLID ELECTROLYTIC CAPACITOR

(71) Applicant: NIPPON CHEMI-CON CORPORATION, Tokyo (JP)

(72) Inventors: Kenji Machida, Tokyo (JP); Kenji Tamamitsu, Tokyo (JP); Ryo Muroi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 128 days.

(21) Appl. No.: 14/426,106

(22) PCT Filed: Aug. 28, 2013

(86) PCT No.: PCT/JP2013/072944
§ 371 (c)(1),
(2) Date: Mar. 4, 2015

(87) PCT Pub. No.: WO2014/038440
PCT Pub. Date: Mar. 13, 2014

(65) Prior Publication Data
US 2015/0255222 A1    Sep. 10, 2015

(30) Foreign Application Priority Data

Sep. 5, 2012   (JP) ................................ 2012-195599

(51) Int. Cl.
| | |
|---|---|
| H01G 9/145 | (2006.01) |
| H01G 9/035 | (2006.01) |
| H01G 9/055 | (2006.01) |
| H01M 6/04 | (2006.01) |
| C08F 2/10 | (2006.01) |
| C08F 2/06 | (2006.01) |
| H01G 9/028 | (2006.01) |
| H01G 9/15 | (2006.01) |

(52) U.S. Cl.
CPC ............... *H01G 9/145* (2013.01); *C08F 2/06* (2013.01); *C08F 2/10* (2013.01); *H01G 9/028* (2013.01); *H01G 9/035* (2013.01); *H01G 9/055* (2013.01); *H01G 9/15* (2013.01); *H01M 6/04* (2013.01); *C08L 2666/30* (2013.01); *C08L 2666/34* (2013.01); *Y10T 29/417* (2015.01)

(58) Field of Classification Search
None
See application file for complete search history.

(56) References Cited

U.S. PATENT DOCUMENTS

| | | | |
|---|---|---|---|
| 4,987,042 A | 1/1991 | Jonas et al. | |
| 2004/0192548 A1* | 9/2004 | Hara | B41M 5/42 503/201 |
| 2009/0185941 A1* | 7/2009 | Breznova | H01G 9/0032 419/26 |
| 2011/0128675 A1* | 6/2011 | Merker | H01G 9/0036 361/523 |
| 2013/0037411 A1 | 2/2013 | Atobe et al. | |

FOREIGN PATENT DOCUMENTS

| | | |
|---|---|---|
| JP | 61-239617 A | 10/1986 |
| JP | 1-313521 A | 12/1989 |
| JP | 2-58818 A | 2/1990 |
| JP | 2-235321 A | 9/1990 |
| JP | 3-18009 A | 1/1991 |
| JP | 3-167815 A | 7/1991 |
| JP | 2000-269087 A | 9/2000 |
| JP | 2008-37975 A | 2/2008 |
| JP | 2008-118060 A | 5/2008 |
| JP | 2008-288342 A | 11/2008 |
| JP | 2012-89542 A | 5/2012 |
| WO | WO 2011/108254 A1 | 9/2011 |
| WO | WO 2011/108255 A1 | 9/2011 |

OTHER PUBLICATIONS

Murakami et al. (JP 2008-288342) English text machine translation, accessed on the AIPN JPO website on Sep. 6, 2016.*
Inoue et al. (JP 2012-089542) English text machine translation, accessed on the AIPN JPO website on Sep. 6, 2016.*
International Search Report issued in PCT/JP2013/072944, mailed on Nov. 19, 2013.
Tamburri et al., "Growth mechanisms, morphology, and electroactivity of PEDOT layers produced by electrochemical routes in aqueous medium," Synthetic Metals, 2008, 159(5-6), pp. 406-414.

* cited by examiner

*Primary Examiner* — Mark Kopec
*Assistant Examiner* — Katie L Hammer
(74) *Attorney, Agent, or Firm* — Birch, Stewart, Kolasch & Birch, LLP

(57) ABSTRACT

Provided is a polymerization liquid for electropolymerization, which uses a solvent that is mainly composed of water, which is greatly increased in the amount of a monomer contained therein, and which is capable of quickly forming a conductive polymer layer having high conductivity and heat resistance, A polymerization liquid for electropolymerization of the present invention contains: a solvent that is composed of 100-80% by mass of water and 0-20% by mass of an organic solvent; at least one monomer having a pi-conjugated double bond; at least one supporting electrolyte; and at least two nonionic surfactants. The at least two nonionic surfactants are composed of at least one acetylenol surfactant and at least one water-soluble nonionic surfactant other than the acetylenol surfactant. Due to the combination of the two nonionic surfactants, the amount of the monomer emulsified with the solvent can be greatly increased.

20 Claims, No Drawings

POLYMERIZATION LIQUID, CONDUCTIVE POLYMER FILM OBTAINED FROM POLYMERIZATION LIQUID, AND SOLID ELECTROLYTIC CAPACITOR

BACKGROUND OF THE INVENTION

1. Field of the Invention

The present invention relates to a polymerization liquid for electrolytic polymerization that can rapidly produce a conductive polymer layer with high conductivity and heat resistance. The present invention also relates to a conductive polymer film and a solid electrolytic capacitor which are obtained from the polymerization liquid.

2. Description of the Related Art

A conductive polymer obtained from polymerization of a monomer with a π-conjugated double bond such as thiophene, aniline and pyrrole is highly conductive and suitable for various electrochemical purposes, and has been applied to various fields such as a solid electrolytic capacitor as well as a polymer battery, an antistatic film, an indicating element, a sensor, and an electrode material. For example, the conductive polymer is suitably used in a solid electrolytic capacitor that contains a positive electrode in which an oxide film as a dielectric is provided on the surface of a valve metal foil such as aluminum, tantalum or niobium and a conductive polymer layer that contacts the oxide film and functions as a true negative electrode.

These conductive polymers can be obtained by an electrolytic polymerization method or a chemical polymerization method (for example, see Patent Document 1 (JP H1-313521 A)), and by the electrolytic polymerization method, whereby a conductive polymer film with excellent mechanical strength is formed on an electrode from a small quantity of monomer in a short period of time. The conductive polymer formed on the electrode is used in a form where it is separated from the electrode or in a form where it is kept placed on the electrode.

A polymerization liquid for electrolytic polymerization that is used to obtain these conductive polymers generally contains a monomer with π-conjugated double bond, a supporting electrode, and a solvent to dissolve them. The solvent of the polymerization liquid is suitably selected based on a consideration of the solubility of a monomer or other factors.

For example, Patent Document 1 discloses a method to obtain a conductive polymer by electrolytic polymerization of a 3,4-disubstituted thiophene such as 3,4-ethylenedioxythiophene (hereinafter 3,4-ethylenedioxythiophene is referred to as "EDOT" and poly(3,4-ethylenedioxythiophene) is referred to as "PEDOT"), and in working examples, acetonitrile is used as a solvent of a polymerization liquid. Patent Document 2 (JP S61-239617 A) discloses a method to obtain a conductive polymer by electrolytic polymerization of an aniline substituted by an alkyl group or an alkoxyl group, and in working examples, water is used as a solvent of the polymerization liquid.

Patent Document 3 (JP H3-18009 A) discloses that electrolytic polymerization using polymerization liquid containing non-substituted pyrrole as a monomer and p-toluenesulfonate as a supporting electrolyte forms a conductive polymer layer of a solid electrolytic capacitor, and in working examples, acetonitrile or water is used as a solvent of the polymerization liquid. Patent Document 4 (JP H2-58818 A) discloses that electrolytic polymerization using a polymerization liquid containing an organic solvent, a monomer such as pyrrole, thiophene or azulene, and an alkyl-substituted ammonium borodisalicylate as a supporting electrolyte forms a conductive polymer layer of a solid electrolytic capacitor. Patent Document 4 also states that a polymerized film with a problem in terms of thermal stability is obtained from a polymerization liquid where ammonium borodisalicylate with low solubility against organic solvent is used as a supporting electrolyte and a solvent in which water is added to an organic solvent is used.

As can be understood from these patent documents, both water and an organic solvent can be suitably selected and used as a solvent of a polymerization liquid for electrolytic polymerization. However, compared with usage of water solvent, usage of organic solvent generally increases the environmental burden and is economically disadvantageous. Further, many organic solvents are hazardous to humans, and in the case of electrolytic polymerization using a combustible solvent, it is necessary to take preventive measures against fire caused by an electric spark. Because the aniline derivative and non-substituted pyrrole specified in Patent Document 2 and Patent Document 3 have comparatively high solubility in water, water can be used as a solvent for polymerization of these monomers, but for polymerization of a monomer that is insoluble or slightly soluble such as the thiophene derivative mentioned in Patent Document 1, there was no other option but to use an organic solvent.

Therefore, also in the case of polymerization of a monomer that is insoluble or slightly soluble in water, a polymerization liquid has been considered in which an anion surfactant or a nonionic surfactant is used and the monomer is emulsified with water, in order to use water as a solvent having a small environmental burden and excellent economic efficiency.

For example, Patent Document 5 (JP 2000-269087 A) reports electrolytic polymerization using an aqueous polymerization liquid where a thiophene derivative such as EDOT is emulsified by an alkylnaphthalenesulfonate surfactant. Because an alkylnaphthalenesulfonate anion that is taken in a conductive polymer layer as a dopant is bulky, de-doping is inhibited, and a conductive polymer layer that is stable at a high temperature in high humidity is obtained. Also, Non-Patent Document 1 (Synthetic Met. (2009), 159 (5-6), 406-414) reports electrolytic polymerization using an aqueous polymerization liquid in which EDOT and sodium polystyrene sulfonate as an anionic surfactant are dissolved. By the action of sodium polystyrene sulfonate, solubility of EDOT in water is increased, EDOT becomes easily oxidizable, and a uniform film is formed on a Pt electrode.

There is no problem if an anion produced by an anion surfactant is used as a dopant of a conductive polymer, but a problem occurs if other anions are intended to be a dopant for the conductive polymer. If an anion surfactant and a supporting electrolyte from which a dopant is produced in a polymerization liquid are used concurrently, the anion surfactant inhibits the anion of the supporting electrolyte from being taken in the conductive polymer layer as a dopant, and the characteristics of the conductive polymer layer obtained such as conductivity and heat resistance are affected.

The applicants reported in Patent Document 6 (WO2011/108254A1) and Patent Document 7 (WO2011/108255A1) as well as in PCT/JP2012/55284 and PCT/JP2012/55285, which were not published at the time of this application, that electrolytic polymerization using an aqueous polymerization fluid containing borodisalicylic salt and bis(pentafluoroethanesulfonyl) imidate as a supporting electrolyte produces a conductive polymer with more excellent heat resistance compared with electrolytic polymerization using a polymerization liquid containing alkylnaphthalenesulfonate and polystyrene sulfonate, which produce a dopant that is bulky and has difficulty causing de-doping. Patent Document 4 states that a polymerized film with a problem in terms of thermal stability is obtained from a polymerization liquid where a solvent in which water is added to an organic solvent is used, but by using the suitable supporting electrolyte, a conductive polymer layer with excellent thermal stability can be obtained from the aqueous polymerization fluid. However, if this preferable supporting electrolyte and an anion surfactant are used concurrently in a polymerization liquid, it becomes difficult for the anion of the suitable supporting electrolyte to be taken into the conductive polymer layer as a dopant, so the heat resistance of the conductive polymer layer is lowered.

On the other hand, if a polymerization liquid containing a supporting electrolyte and a nonionic surfactant is used, the nonionic surfactant is not taken into a conductive polymer layer as a dopant and the taking-in of the anion of the supporting electrolyte into the conductive polymer as a dopant is not inhibited by the nonionic surfactant, because the nonionic surfactant is not ionized. Patent Document 8 (JP H2-235321 A) takes note of this point and discloses a manufacturing method of a solid electrolytic capacitor using a polymerization liquid containing a nonionic surfactant. By using a polymerization liquid in which a monomer for a conductive polymer, an anion as a dopant, and a nonionic surfactant such as polyethylene glycol, polyethylene glycol alkyl ethers, polyethylene glycol fatty acid esters or fatty acid monoglycerides are dissolved and electrolyzing by using an anode foil on which a dielectric oxide film is formed as an anode, a flat and smooth conductive polymer layer that closely contacts the dielectric oxide film is obtained.

Also, Patent Document 9 (JP 2008-37975 A) discloses a method to manufacture a conductive polymer by using a polymerization liquid, which contains a monomer for a conductive polymer, a supporting electrolyte, and a nonionic surfactant selected from compounds having a polyoxyalkylene group such as a (poly)styryl phenol-type polyoxyalkylene compound, a (poly)styryl phenol-formaldehyde condensate-type polyoxyalkylene compound or a (poly)alkyl-substituted phenol-formaldehyde condensate-type polyoxyalkylene compound, in an electrolytic polymerization reaction. By using a specific range of nonionic surfactant with a polyoxyalkylene group, a polymerization liquid with excellent stability is obtained, and a conductive polymer film with excellent evenness and conductivity is obtained. Patent Document 10 (JP 2008-118060 A) discloses a method to obtain a solid electrolytic layer of a solid electrolytic capacitor by electrolytic polymerization using a polymerization liquid containing a monomer for a conductive polymer, an aromatic sulfonate ion as a dopant, and the same nonionic surfactant as is disclosed in Patent Document 9. By using the polymerization liquid, a solid electrolytic capacitor with an even, dense, solid electrolytic layer, which has low equivalent series resistance (ESR) and leakage current, is obtained.

PRIOR ARTS DOCUMENTS

Patent Documents

Patent Document 1: JP H1-313521 A
Patent Document 2: JP S61-239617 A
Patent Document 3: JP H3-18009 A
Patent Document 4: JP H2-58818 A
Patent Document 5: JP 2000-269087 A
Patent Document 6: WO 2011/108254 A1
Patent Document 7: WO 2011/108255 A1
Patent Document 8: JP H2-235321 A
Patent Document 9: JP 2008-37975 A
Patent Document 10: JP 2008-118060 A Non-Patent Documents Non-Patent Document 1: Synthetic Met. (2009), 159 (5-6), 406-414

BRIEF SUMMARY OF THE INVENTION

1. Problems to be Solved by the Invention

Generally, when the amount of a monomer contained in a polymerization liquid for electrolytic polymerization is larger, electrolytic polymerization can progress faster, and a dense conductive polymer layer can be obtained. By including a nonionic surfactant in the polymerization liquid and emulsifying the monomer with water, the amount of a monomer contained in the polymerization liquid can be increased, and by action of the nonionic surfactant, the evenness and density of the conductive polymer layer obtained can also be improved. Compared with an uneven or porous polymer layer, an even, dense conductive polymer layer has a high conductivity and high heat resistance.

However, the amount of a monomer contained in the polymerization liquid cannot be substantially increased by the conventional nonionic surfactant. For example, EDOT (solubility against pure water: $1.1 \times 10^{-2}$ ($\pm 0.3 \times 10^{-2}$)M) was considered by the inventors and it was found that the amount of EDOT contained in a liquid in which the conventional nonionic surfactant, a supporting electrolyte and EDOT in an amount at the limit of emulsification, that is, EDOT in an amount at the limit where EDOT does not separate as an oil drop, were added to water is only approximately twice the amount of EDOT contained in a solution where the supporting electrolyte and EDOT in a saturated amount of dissolution are added to water. Also, in Patent Document 9, thiophene is added to water containing a nonionic surfactant and a supporting electrolyte in Example 25, and EDOT is added to water containing a nonionic surfactant and a supporting electrolyte in Example 28, but in both cases the monomer concentration is only 0.02 mol/liter (see Table 1 of Patent Document 9). Therefore, no nonionic surfactant is known that can substantially increase the amount of a monomer contained in a polymerization liquid that can produce an even, highly conductive polymer layer even if the amount of monomer is substantially increased and therefore give a conductive polymer layer with high conductivity and high heat resistance.

Therefore, the objective of the present invention is to provide a polymerization liquid for electrolytic polymerization having a solvent mainly composed of water, that can contain substantially increased amount of monomer and that can form a conductive polymer, having high conductivity and high heat resistance.

2. Means for Solving Problems

The inventors, after keen examination, found that the above problems were solved by using a particular acetylenol surfactant and a water-soluble nonionic surfactant other than the acetylenol surfactant together as nonionic surfactant to emulsify a monomer with a solvent mainly composed of water.

Therefore, The present invention firstly relates to a polymerization liquid for electrolytic polymerization of at least one monomer with a π-conjugated double bond, comprising:
a solvent composed of 100 to 80% by mass of water and 0 to 20% by mass of an organic solvent;
at least one supporting electrolyte;
a composite nonionic surfactant composed of:
at least one acetylenol surfactant of the formula (1):

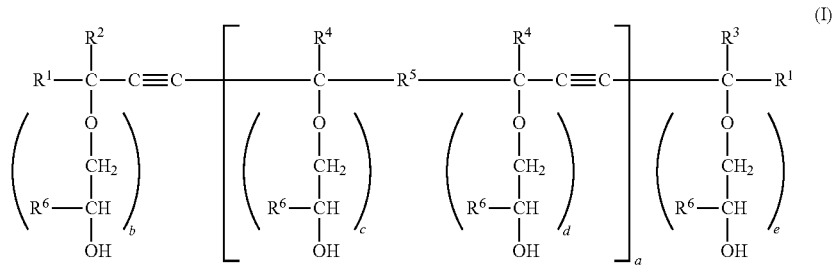

(I)

where a is 0 or 1,
b is an integer number of 0, 1 or more than 1,
c is an integer number of 0, 1 or more than 1,
d is an integer number of 0, 1 or more than 1, and
e is an integer number of 0, 1 or more than 1,
provided that $0 \leq b+e \leq 100$ and $0 \leq c+d \leq 100$;
$R^1$ is hydrogen or methyl group,
$R^2$, $R^3$ and $R^4$ may be the same or different and are independently linear or branched alkyl or alkenyl groups having 1 to 8 carbon atoms,
$R^5$ is a linear or branched alkylene or alkenylene group having 1 to 4 carbon atoms, and
$R^6$ is hydrogen, methyl or ethyl group; and
at least one water-soluble nonionic surfactant other than the acetylenol surfactant;
and
the monomer emulsified with the solvent by the composite nonionic surfactant.

The solvent composed of 100 to 80% by mass of water and 0 to 20% by mass of an organic solvent is hereinafter referred to as "water-rich solvent". In the water-rich solvent, the total amount of water and organic solvent is 100% by mass. The amount of water contained in the water-rich solvent may be 80% by mass or more, preferably 90% by mass or more, more preferably 95% by mass or more, and especially preferably 100% by mass. If the amount of organic solvent contained in the water-rich solvent increases, the conductive polymer layer in which a polymer particle is densely filled becomes difficult to be formed on the electrode by electrolytic polymerization, and if the amount of organic solvent becomes more than 20% by mass of the total solvent, the heat resistance of the conductive polymer film obtained and solid electrolytic capacitor obtained remarkably decreases.

In the polymerization liquid of the present invention, as the composite nonionic surfactant, a combination of an acetylenol nonionic surfactant represented of the formula (I) and a water-soluble nonionic surfactant other than this acetylenol surfactant is used.

In the acetylenol nonionic surfactant, an acetylenediol where a in the formula (I) is 0 and a diacetylenetetraol where a in the formula (I) is 1 are included. It is preferable to use the acetylenediol where a in the formula (I) is 0 because the advantageous effect of the present invention can be better obtained. For the acetylenediol, a compound where $R^1$ is methyl, each of $R^2$ and $R^3$ is isobutyl, and $R^6$ is hydrogen is preferable. The value of b+e is preferably $0 \leq b+e \leq 30$, more preferably $0 \leq b+e \leq 10$, and especially preferably b+e=0. The acetylenediol where a=0 and b+e=0 is preferable because the electron density around a carbon-carbon triple bond is particularly high because of a hydroxy group and an alkyl or alkenyl group, which are combined with a carbon atom adjacent to the carbon-carbon triple bond. 2,4,7,9-tetramethyl-5-decyne-4,7-diol is particularly preferable.

In the composite nonionic surfactant, the nonionic surfactant to be combined with the acetylenol nonionic surfactant of the formula (I) can be used without any restriction as long as it is water-soluble, but it is preferable to select from a group consisting of polyoxyethylene alkylphenyl ethers because the advantageous effect of the present invention can be better obtained.

The sole use of either one of the acetylenol surfactant of the formula (I) and the water-soluble nonionic surfactant other than the acetylenol surfactant cannot substantially increase the emulsified amount of the monomer in the polymerization liquid. The acetylenol nonionic surfactant is characterized by high polarity due to high electron density around the carbon-carbon triple bond. By combining this characteristic acetylenol nonionic surfactant with another water-soluble nonionic surfactant, the emulsified amount of the monomer in the polymerization liquid can be substantially increased.

To explain in more detail, if the amount of a monomer in a liquid where a supporting electrolyte and a monomer at the amount of saturated solubility are added to a water-rich solvent is represented as W; the amount of a monomer in a liquid where x % by mass of the acetylenol nonionic surfactant, the supporting electrolyte and the monomer in an amount at the limit of emulsification are added to the water-rich solvent is represented as X; the amount of a monomer in a liquid where y % by mass of the water-soluble nonionic surfactant, the supporting electrolyte and the monomer in an amount at the limit of emulsification are added to the water-rich solvent is represented as Y; and the amount of a monomer in a liquid where x % by mass of the acetylenol nonionic surfactant, y % by mass of the water-soluble nonionic surfactant, the supporting electrolyte and the monomer in an amount at the limit of emulsification are added to the water-rich solvent is represented as Z, then the amount of a monomer that is increased by the combination of the acetylenol nonionic surfactant and the water-soluble nonionic surfactant (Z−W) becomes more than the total of the amount of a monomer that is increased by the use of the acetylenol nonionic surfactant (X−W) and the amount of a monomer that is increased by the use of the water-soluble nonionic surfactant (Y−W).

As a result, it is considered that the limit on the amount of emulsification of the monomer in the polymerization liquid is substantially increased by a synergetic effect of the acetylenol nonionic surfactant and the water-soluble non-ionic surfactant. By performing electrolytic polymerization using the polymerization liquid of the present invention containing monomer in a substantially increased quantity, an even and dense conductive polymer layer can be rapidly formed. As a result, a conductive polymer film with high conductivity and high heat resistance can be obtained, and also, a solid electrolytic capacitor with low ESR and high heat resistance can be obtained.

As the monomer to be emulsified with the water-rich solvent by the nonionic surfactants, any monomer with a π-conjugated double bond can be used without restriction. In the case of a monomer with relatively high solubility in water such as an aniline derivative or non-substituted pyrrole, the advantageous effect of the present invention can be obtained if the composite nonionic surfactant is used because even more monomers can be emulsified by the solvent. However, it is preferable to use a monomer which is insoluble or poorly soluble in water for the polymerization liquid of the present invention. Generally, the electrolytic polymerization of such a monomer is hard to progress, and an uneven, low conductive polymer is often obtained, but with the polymerization liquid of the present invention, the amount of monomer contained in the polymerization liquid can be substantially increased by the composite nonionic surfactant, so electrolytic polymerization can proceed rapidly and an even, dense polymer layer can be obtained. It is preferable to use a compound selected from a group consisting of 3,4-disubstituted thiophene compounds, especially EDOT, as a monomer because a transparent, environmentally stable conductive polymer layer can be obtained.

As for the polymerization liquid of the present invention, a heretofore known supporting electrolyte can be used without any restriction, but it is preferable to use as the supporting electrolyte a compound selected from a group consisting of organic non-sulfonate supporting electrolytes having an anion with the molecular weight of 200 or more, because a conductive polymer film and solid electrolytic capacitor that have particularly excellent heat resistance can be obtained. An "organic non-sulfonate supporting electrolyte" refers to a supporting electrolyte of an organic compound that does not have a sulfonic acid group and/or a sulfonic acid salt group. Among the organic non-sulfonate supporting electrolytes having an anion with the molecular weight of 200 or more, borodisalicylic acid and a borodisalicylic salt are preferable because they are inexpensive and economically advantageous, and can produce a conductive polymer layer with especially excellent heat resistance and smoothness.

However, it is known that, in water, a borodisalicylate ion contained in borodisalicylic acid and a borodisalicylic salt is hydrolyzed into salicylic acid and boric acid, which have extremely low solubility in water. Therefore, if borodisalicylic acid and/or a borodisalicylic salt are used as the supporting electrolyte, precipitation is gradually produced in a polymerization liquid and the liquid becomes unusable. To avoid this, when borodisalicylic acid and/or a borodisalicylic salt are used as the supporting electrolyte, electrolytic polymerization is performed after this supporting electrolyte is added to the liquid and before precipitation is produced, or borodisalicylic acid and/or a borodisalicylic salt are used together with a stabilizer selected from a group composed of nitrobenzene and nitrobenzene derivatives, which has an action to inhibit the hydrolysis of a borodisalicylate ion. As for this stabilizer, a stabilizer that is readily water-soluble is preferable, and at least one compound selected from a group consisting of o-nitrophenol, m-nitrophenol and p-nitrophenol is especially preferable.

By using the polymerization liquid of the present invention, a conductive polymer film with excellent conductivity and heat resistance can be obtained. Therefore, the present invention also relates to a conductive polymer film obtained by introducing a substrate with a conductive part into the polymerization liquid of the present invention and performing electrolytic polymerization.

Further, the polymerization liquid of the present invention can also be used to manufacture a solid electrolytic capacitor that comprises: a positive electrode in which an oxide film as a dielectric is formed on the surface of a valve metal foil such as aluminum, tantalum or niobium foil; and a conductive polymer layer that contacts the oxide film and functions as a true negative. By using the polymerization liquid of the present invention, a capacitor with low ESR and excellent heat resistance can be obtained. Therefore, the present invention also relates to a first form of solid electrolytic capacitor comprising a positive electrode composed of a valve metal foil with an oxide film on the surface and a conductive polymer layer located on the positive electrode, where the conductive polymer layer is formed by introducing the positive electrode into the electrolytic polymerization liquid of the present invention and by performing electrolytic polymerization. A conductive layer (an apparent negative electrode) is placed on the conductive polymer, and thus the first solid electrolytic capacitor is constituted.

The present invention also relates to a second form of solid electrolytic capacitor comprising a positive electrode composed of a valve metal foil with an oxide film on the surface; a negative electrode composed with a valve metal foil; and a separator holding a conductive polymer layer located between the positive electrode and the negative electrode, where the conductive polymer layer is formed by introducing a capacitor element comprising the positive electrode, the negative electrode and a separator located between them into a polymerization liquid of the present invention, thereby impregnating the polymerization liquid into the capacitor element, and performing electrolytic polymerization. By this electrolytic polymerization, a conductive polymer layer is held by the separator. By this method, a wound-type or laminating-type of solid electrolytic capacitor can be obtained.

3. Advantageous Effects of the Invention

By using the polymerization liquid of the present invention, which comprises a water-rich solvent, a supporting electrolyte, a composite nonionic surfactant composed of an acetylenol surfactant of the formula (I) and a water-soluble nonionic surfactant other than the acetylenol surfactant, and a monomer with a π-conjugated double bond that is emulsified with the solvent by the composite nonionic surfactant, an even, dense conductive polymer layer can be rapidly formed by electrolytic polymerization because a substantially increased amount of monomer can be emulsified with the solvent by the action of the composite nonionic surfactant. As a result, a conductive polymer film with high conductivity and high heat resistance can be obtained, and also, a solid electrolytic capacitor with low ESR and high heat resistance can be obtained.

DETAILED DESCRIPTION OF THE INVENTION (1) Polymerization Liquid

In the polymerization liquid for electrolytic polymerization of the present invention, a water-rich solvent, a supporting electrolyte, a composite nonionic surfactant, and a monomer with a π-conjugated double bond that is emulsified with the solvent by the composite nonionic surfactant are comprised as essential elements.

In the polymerization liquid of the present invention, water, which has small environmental burden and excellent economic efficiency, is used as the main solvent. In the polymerization liquid of the present invention, organic solvents such as methanol, ethanol, isopropanol, butanol, ethylene glycol, diethylene glycol, propylene glycol, ethylene glycol monobutyl ether, acetonitrile, acetone, tetrahydrofuran, and methyl acetate can be included in addition to water, but more than 80% by mass of the total solvent should be water, and preferably water should be 90% by mass of the total solvent, more preferably 95% by mass of the total solvent, and it is especially preferable that the solvent consists of water only. If the amount of the organic solvent in the water-rich solvent is increased, a conductive polymer layer in which polymer particles are densely filled becomes difficult to be formed on the electrode by electrolytic polymerization, and when the amount of the organic solvent exceeds 20% by mass of the total solvent, the heat resistance of a conductive polymer film and a solid electrolytic capacitor thus obtained remarkably decreases.

In the polymerization liquid of the present invention, a monomer with a π-conjugated double bond is comprised as a monomer. Monomers with a π-conjugated double bond that are conventionally used in the manufacture of conductive polymers can be used without any restriction as long as the monomers are stable in the water-rich solvent. Representative monomers are exemplified in the following.

Examples are, firstly, thiophene and a thiophene derivative including a 3-alkylthiophene such as 3-methylthiophene and 3-ethylthiophene, a 3,4-dialkylthiophene such as 3,4-dimethylthiophene and 3,4-diethylthiophene, a 3-alkoxythiophene such as 3-methoxythiophene and 3-ethoxythiophene, a 3,4-dialkoxythiophene such as 3,4-dimethoxythiophene and 3,4-diethoxythiophene, a 3,4-alkylenedioxythiophene such as 3,4-methylenedioxythiophene, EDOT and 3,4-(1,2-propylenedioxyl)thiophene, a 3,4-alkyleneoxythiathiophene such as 3,4-methyleneoxythiathiophene, 3,4-ethyleneoxythiathiophene and 3,4-(1,2-propyleneoxythia)thiophene, a 3,4-alkylenedithiathiophene such as 3,4-methylenedithiathiophene, 3,4-ethylenedithiathiophene and 3,4-(1,2-propylenedithia)thiophene, and a alkylthieno[3,4-b]thiophene such as thieno[3,4-b]thiophene, isopropylthieno[3,2-b]thiophene and t-butyl-thieno[3,4-b]thiophene.

Also, pyrrole and a pyrrole derivative including a N-alkylpyrrole such as N-methylpyrrole and N-ethylpyrrole, a 3-alkylpyrrole such as 3-methylpyrrole and 3-ethylpyrrole, a 3-alkoxypyrrole such as 3-methoxypyrrole and 3-ethoxypyrrole, N-phenylpyrrole, N-naphthylpyrrole, a 3,4-dialkylpyrrole such as 3,4-dimethylpyrrole and 3,4-diethylpyrrole, and a 3,4-dialkoxypyrrole such as 3,4-dimethoxypyrrole and 3,4-diethoxypyrrole can be used.

Also, aniline and an aniline derivative including a 2,5-dialkylaniline such as 2,5-dimethylaniline and 2-methyl-5-ethylaniline, a 2,5-dialkoxyaniline such as 2,5-dimethoxyaniline and 2-methoxy-5-ethoxyaniline, a 2,3,5-trialkoxyaniline such as 2,3,5-trimethoxyaniline and 2,3,5-triethoxyaniline, and a 2,3,5,6-tetraalkoxyaniline such as 2,3,5,6-tetramethoxyaniline and 2,3,5,6-tetraethoxyaniline can be used.

Also, furan and a furan derivative including a 3-alkylfuran such as 3-methylfuran and 3-ethylfuran, a 3,4-dialkylfuran such as 3,4-dimethylfuran and 3,4-diethylfuran, a 3-alkoxyfuran such as 3-methoxyfuran and 3-ethoxyfuran, and a 3,4-dialkoxyfuran such as 3,4-dimethoxyfuran and 3,4-diethoxyfuran can be used.

As a monomer, a 3,4-disubstituted thiophene is preferable because a transparent and environmentally stable conductive polymer can be obtained. Substituents at the 3- and 4-positions of the thiophene ring may form a ring together with carbons at the 3- and 4-positions. The usage of EDOT is especially preferable.

The monomer can be a single compound or a combination of two or more kinds of compound, and the monomer in an amount exceeding the saturated solubility against a solution not containing a nonionic surfactant is used. The monomer exceeding the saturated solubility is emulsified with the water-rich solvent by the action of the composite nonionic surfactant. It is preferable to use the monomer at the limit of emulsification in the polymerization liquid, that is, at the amount where the monomer does not separate as an oil drop. The amount at the limit of emulsification can be determined by a simple preliminary experiment.

In the polymerization liquid of the present invention, a supporting electrolyte that produces a dopant in the polymerization liquid is comprised. An anion of the supporting electrolyte is taken as a dopant in the conductive polymer layer in the course of electrolytic polymerization shown below. As the supporting electrolyte, a supporting electrolyte that is used in the manufacture of conventional conductive polymers can be used without any limitation. Representative supporting electrolytes are given below, and to form a conductive polymer layer of a solid electrolytic capacitor, a supporting electrolyte without a halogen atom is preferably used.

Firstly, a hydrogen halide such as hydrogen iodide, hydrogen bromide, and hydrogen chloride; an inorganic acid such as boric acid, nitric acid, sulfuric acid, phosphoric acid, tetrafluoroboric acid, hexafluorophosphoric acid, hexafluoroarsenic acid, hexafluoroantimonic acid, perchloric acid, molybdophosphoric acid, tungstophosphoric acid, and tungstomolybdophosphoric acid; a carboxylic acid such as acetic acid, oxalic acid, ascotic acid, caprylic acid, and lauric acid; an oxocarbonic acid such as squaric acid, rhodizonic acid, and croconic acid, a hydroxycarboxylic acid such as lactic acid, tartaric acid, citric acid, and salicylic acid; an organophosphate such as monopropyl phosphate, dipropyl phosphate, monohexyl phosphate, dihexyl phosphate, monododecyl phosphate, and didodecyl phosphate, an organosulfate such as methyl sulfate and dodecyl sulfate, and a boron complex such as borodioxalic acid, boroditartaric acid, borodicitric acid, borodisalicylic acid, oxalatosalicylatoboric acid, and borodipyrocatechol; and a salt thereof can be used.

Also, a sulfonic acid such as methanesulfonic acid, trifluoromethane sulfonic acid, dodecylsulfonic acid, benzenesulfonic acid, 1,2-dihydroxy-3,5-benzenedisulfonic acid, dodecylbenzenesulfonic acid, p-toluenesulfonic acid, xylenesulfonic acid, 2-naphthalenesulfonic acid, 1,7-naphthalenedisulfonic acid, naphthalene-1,3,6-trisulfonic acid, butylnaphthalenesulfonic acid, anthracenesulfonic acid, anthraquinone-2-sulfonic acid, anthraquinone-1,5-disulfonic acid, biphenylsulfonic acid, biphenyldisulfonic acid, polystyrene sulfonic acid and naphthalenesulfonic acid-formaldehyde condensate, a sulfocarboxylic acid such as sulfobenzoic acid, sulfoisophthalic acid, sulfosuccinic acid, and dioctylsulfosuccinic acid, and a sulfonylimidic acid such as bis(trifluoromethanesulfonyl)imidic acid, bis(pentafluoroethanesulfonyl)imidic acid, bis(nonafluorobutanesulfonyl)imidic acid, and 1,1,2,2,3,3-hexafluoro-1,3-disulfonylimidic acid; and a salt thereof can be used.

As a salt, an alkali metal salt such as a lithium salt, a sodium salt and a potassium salt; an alkaline earth metal salt such as a beryllium salt, a magnesium salt and a calcium salt; ammonium salt; an alkylammonium salt such as an ethylammonium salt and a butylammonium salt; a dialkylammonium salt such as a diethyl ammonium salt and a dibutylammonium salt; a trialkylammonium salt such as a triethylammonium salt and tributylammonium salt; a tetraalkylammonium salt such as a tetraethylammonium salt and a tetrabutylammonium salt; and a tetraalkylphosphonium salt such as a tetramethylphosphonium salt, a triethylmethylphosphonium salt; a tetraethylphosphonium salt, and tetrabutylphosphonium salt can be used.

The supporting electrolyte can be a single compound or a combination of two or more kinds of compound. The supporting electrolyte is used at a density of the saturated amount or less in the polymerization liquid and in an amount that produces sufficient electric current for electrolytic polymerization; it is preferably used at a density of 10 mM or more, and particularly preferably at a density of 30 mM or more.

In the polymerization liquid of the present invention, it is preferable to use an organic non-sulfonate supporting electrolytes having an anion with the molecular weight of 200 or more, and especially, borodisalicylic acid, a borodisalicylic salt, a sulfonylimidic acid of the formula (II) or the formula (III), or a salt thereof can be preferably used.

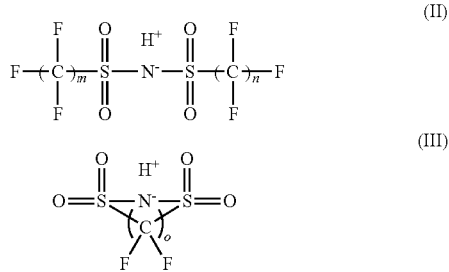

In the above formulae, m is an integer from 1 to 8, preferably from 1 to 4, and especially preferably 2, n is an integer from 1 to 8, preferably an integer from 1 to 4, and especially preferably 2, and o is an integer 2 or 3. These supporting electrolytes give a conductive polymer with particularly excellent heat resistance. Among these supporting electrolytes, a salt of bis(pentafluoroethanesulfonyl)imide acid, for example, potassium salt, sodium salt, or ammonium salt, gives a conductive polymer layer with extremely high heat resistance. Also, borodisalicylic acid and a borodisalicylic salt are preferable because they are inexpensive and therefore have economically advantageous, and they produce flat and smooth conductive polymers having excellent heat resistance.

However, it is known that, in water, a borodisalicylic ion contained in borodisalicylic acid and a borodisalicylic salt is hydrolyzed into salicylic acid and boric acid, which have extremely low solubility into water. Therefore, if borodisalicylic acid and/or a borodisalicylic salt are used as the supporting electrolyte, precipitation is gradually produced in a polymerization liquid and the liquid becomes unusable. To avoid this, when borodisalicylic acid and/or a borodisalicylic salt are used as the supporting electrolyte, electrolytic polymerization is performed after this supporting electrolyte is added to the liquid and before precipitation is produced, or borodisalicylic acid and/or a borodisalicylic salt are used together with a stabilizer selected from a group consisting of nitrobenzene and nitrobenzene derivatives. Because this stabilizer forms a complex with a borodisalicylate ion, hydrolysis of the borodisalicylate ion is inhibited.

The stabilizer can be a single compound or a combination of compounds of two or more kinds. Examples of nitrobenzene derivatives are nitrophenol, nitrobenzyl alcohol, nitrobenzoic acid, dinitrobenzoic acid, dinitrobenzene, nitroanisole and nitroacetophenone. The stabilizer is preferably an easily water-soluble compound, and o-nitrophenol, m-nitrophenol, p-nitrophenol, or a mixture thereof is especially preferable.

The stabilizer is used in a concentration of the amount of saturated solubility or less in the polymerization liquid, and generally used in an amount of more than ⅛ mol per 1 mol of the supporting electrolyte selected from a group consisting of borodisalicylic acid and borodisalicylic salts. The compound whose saturated solubility in the polymerization liquid is ⅛ mol or less per 1 mol of the supporting electrolyte is used in a mixture with other compounds. If the amount of the stabilizer is ⅛ mol or less per 1 mol of the supporting electrolyte, the effect to inhibit precipitation formation may not be sufficient. The amount of the stabilizer is preferably ¼ mol or more per 1 mol of the supporting electrolyte, more preferably ½ mol or more, and especially preferably 1 mol or more.

The polymerization liquid of the present invention comprises the water-rich solvent, the monomer with a π-conjugated double bond, the supporting electrolyte, and a composite nonionic surfactant to emulsify the monomer with the water-rich solvent. By the composite nonionic surfactant, a substantially increased amount of monomer is concentrated in a micelle of the nonionic surfactant, so electrolytic polymerization proceeds rapidly, and a conductive polymer that is even and dense, and therefore has high conductivity and heat resistance, is obtained. Moreover, the nonionic surfactant itself is not ionized and so doping to the polymer by the anion of the supporting electrolyte is not inhibited, nor is complex formation of the stabilizer and a borodisalicylate ion inhibited. Therefore, even if the organic non-sulfonate supporting electrolyte, which produces a conductive polymer layer with high heat resistance, and the composite nonionic surfactant are used together, the heat resistance of a conductive polymer obtained by electrolytic polymerization does not decrease.

The composite nonionic surfactant in the polymerization liquid of the present invention is composed of at least one acetylenol surfactant of the formula (I) and at least one water-soluble nonionic surfactant other than the acetylenol surfactant.

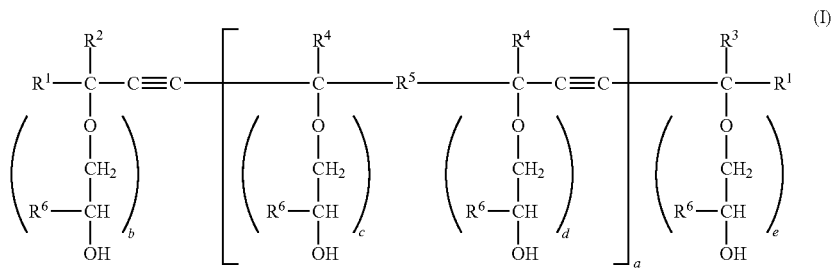

(I)

In the formula (I), a is 0 or 1, b is an integer number of 0, 1 or more than 1, c is an integer number of 0, 1 or more than 1, d is an integer number of 0, 1 or more than 1, and e is an integer number of 0, 1 or more than 1, provided that $0 \leq b+e \leq 100$ and $0 \leq c+d \leq 100$; $R^1$ is hydrogen or methyl group, $R^2$, $R^3$ and $R^4$ may be the same or different and are independently linear or branched alkyl or alkenyl groups having 1 to 8 carbon atoms, $R^5$ is a linear or branched alkylene or alkenylene group having 1 to 4 carbon atoms, and $R^6$ is hydrogen, methyl or ethyl group. Each of the acetylenol surfactant and the water-soluble nonionic surfactant other than the acetylenol surfactant can be a single compound or a compound of more than two kinds.

The sole use of either one of the acetylenol nonionic surfactant of the formula (I) and the water-soluble nonionic surfactant other than the acetylenol surfactant cannot substantially increase the emulsified amount of the monomer in the polymerization liquid. By the synergetic effect of the acetylenol surfactant and the water-soluble nonionic surfactant, the emulsified amount of monomer in a polymerization liquid can be substantially increased.

In the formula (I), methyl group is preferred for $R^1$. As for $R^2$, $R^3$ and $R^4$, methyl group, ethyl group, propyl group, isopropyl group, butyl group, isobutyl group, pentyl group, isopentyl group, hexyl group, isohexyl group, 1-ethylpentyl group, 1-ethylhexyl group, octyl group, 2-butenyl group, 3-methyl-2-butenyl group, and 4-methyl-3-pentenyl group are exemplified, but a C4-C6 branched alkyl group, especially isobutyl group is preferred. As for $R^5$, methylene group, ethylene group, 1,2-dimethyl ethylene group, and ethenylene group are exemplified, but ethylene group is preferred. Also, if b, c, d, and e are 2 or more, the multiple $R^6$s contained in a single chain can be the same or different, and two or more groups selected from hydrogen, methyl group or ethyl group can be contained in a single chain. It is preferable that all the $R^6$s contained in a single chain are hydrogen.

The acetylenol nonionic surfactant includes an acetylenediol in which a in the formula (I) is 0 and a diacetylenetetraol in which a in the formula (I) is 1, but the acetylenediol in which a is 0 is preferably used. The value of b+e is preferably $0 \leq b+e \leq 30$, more preferably $0 \leq b+e \leq 10$, and especially preferably b+e=0. In the case of a=1, the value of c+d is preferably $0 \leq c+d \leq 30$, more preferably $0 \leq c+d \leq 10$, and especially preferably c+d=0. A compound in which a=0 and b+e=0 is preferable because the electron density around the carbon-carbon triple bond becomes particularly high due to a hydroxy group and an alkyl or alkenyl group that are combined with a carbon atom adjacent to the carbon-carbon triple bond.

Examples of the acetylenol surfactant are; 2,4,7,9-tetramethyl-5-decyne-4,7-diol, 5-decyne-4,7-diol, 4,7-dimethyl-5-decyne-4,7-diol, 2,5,8,11-tetramethyl-3,9-dodecadiyne-2,5, 8,11-tetraol, 2,3,6,7-tetramethyl-4-octyne-3,6-diol, 3,6-dimethyl-4-octyne-3,6-diol, 2,5-dimethyl-3-hexyne-2,5-diol, 5,8-dimethyl-6-dodecyne-5,8-diol, 2,5,8,11-tetramethyl-6-dodecyne-5,8-diol, 7-tetradecyne-6,9-diol, 8-hexadecyne-7,10-diol, 7,10-dimethyl-8-hexadecyne-7,10-diol, 2,6,9,13-tetramethyl-2,12-tetradecadien-7-in-6,9-diol, 2,6,9-trimethyl-2-decene-7-in-6,9-diol, 5,10-diethyl-7-tetradecyne-6,9-diol, and an ethoxylate, propoxylate and butoxylate thereof.

Among the acetylenol surfactants of the formula (I), a non-alkoxylated compound (a compound where b, c, d and e are 0) can be obtained by reacting a given ketone or aldehyde with acetylene in the presence of a basic catalyst. A alkoxylated compound can be obtained by reacting the non-alkoxylated compound with a given mol number of alkylene oxide in the presence of a basic catalyst. These are commercially available as Surfynol (registered trademark) surfactants from Air Products and Chemicals Inc.

The acetylenol nonionic surfactant of the formula (I) is used together with a nonionic surfactant other than the acetylenol nonionic surfactant. The nonionic surfactant that is used concurrently has no restriction as long as it is water-soluble. Examples are polyalkylene glycol, polyvinyl alcohol, polyoxyalkylene alkyl ether, polyoxyalkylene alkylphenyl ether, polyoxyalkylene styrylphenyl ether, polyoxyalkylene benzylphenyl ether, polyoxyalkylene alkylphenol ether formaldehyde condensate, polyoxyalkylene styrylphenol ether formaldehyde condensate, polyoxyalkylene benzylphenol ether formaldehyde condensate, polyoxyalkylene fatty acid ester, polyoxyalkylene sorbitan fatty acid ester, polyoxyalkylene castor oil, polyoxyalkylene hardened castor oil, polyglycerol alkyl ether and polyglycerol fatty acid ester. These can be used alone or used as a mixture of two or more kinds. It is preferable to use a polyoxyethylene alkylphenyl ether such as branched polyoxyethylene (9) nonylphenyl ether together with the acetylenol nonionic surfactant of the formula (I).

The acetylenol nonionic surfactant of the formula (I) is used in an amount of 0.05 to 2% by mass, and preferably 0.1 to 1% by mass, against the water-rich solvent. Also, the water-soluble nonionic surfactant is used in an amount that is 1 to 5 times, and preferably 2 to 5 times in a mass ratio of the acetylenol nonionic surfactant.

The preparation of the polymerization liquid is performed by the following method. The polymerization liquid is prepared by introducing the water-rich solvent, the monomer with a π-conjugated double bond, the supporting electrolyte, the composite nonionic surfactant composed of the acetylenol surfactant of the formula (I) and the water-soluble surfactant other than the acetylenol surfactant into a recipient for preparing a polymerization liquid, dissolving the supporting electrolyte and the composite nonionic surfactant into the water-rich solvent by use of a hand process or a mechanical means of stirring or irradiation of ultrasonic sound, and simultaneously emulsifying the monomer. Also, after introducing the water-rich solvent, the monomer with a π-conjugated double bond, the composite nonionic surfactant composed of the acetylenol surfactant of the formula (I) and the water-soluble surfactant other than the acetylenol surfactant into a recipient for preparing a polymerization liquid, dissolving the composite nonionic surfactant into the water-rich solvent and simultaneously preparing a liquid in which a monomer is emulsified, the supporting electrolyte may be added to this liquid and dissolved into it immediately before electrolytic polymerization. In these methods, the acetylenol surfactant of the formula (I) and the water-soluble surfactant other than the acetylenol surfactant can be added to the liquid separately or at the same time. If they are added separately, either one of them can be added to the liquid first. If each of the components in the polymerization liquid is stable, the temperature at the time of preparation has no restrictions.

If borodisalicylic acid and/or a salt thereof is used as the supporting electrolyte, preferably nitrobenzene and/or its derivative is further added as the stabilizer to the polymerization liquid. The stabilizer inhibits precipitation formation due to hydrolysis of a borodisalicylate ion by forming a complex with a borodisalicylate ion, so that the stabilizer is added to the water-rich solvent at least almost at the same time with the borodisalicylic acid and/or its salt, and preferably, the stabilizer is added to the water-rich solvent prior to borodisalicylic acid and/or its salt.

In the polymerization liquid of the present invention, the water-rich solvent, the supporting electrolyte, the composite nonionic surfactant, and the monomer with a π-conjugated double bond that is emulsified into the solvent by the composite nonionic surfactant are comprised as essential elements, but other elements can also be comprised in the polymerization liquid as long as they do not adversely affect the advantageous effect of the present invention. An example of such an element is a pH adjuster.

(2) Electrolytic Polymerization

By electrolytic polymerization using the polymerization liquid of the present invention, an even, dense conductive polymer layer with high conductivity and high heat resistance is obtained. The electrolytic polymerization using the polymerization liquid of the present invention is performed to form a conductive polymer film for various purposes as well as to form a conductive polymer layer in a solid electrolytic capacitor. In the following, electrolytic polymerization to form a general conductive polymer film and electrolytic polymerization to form a conductive polymer layer in a solid electrolytic capacitor are explained separately.

(a) Formation of a General Conductive Polymer Film

As a working electrode (a substrate of a conductive polymer film) to be introduced into the polymerization liquid of the present invention, a material with a conductive part at least on the surface is used, where a plate, foil, net, sintered compact or foam of a conductor such as platinum, nickel, titanium, steel or carbon can be used. Also, a transparent substrate where a deposition layer of semiconductive ceramic such as tin-doped indium oxide (ITO), tin oxide, or fluorine-doped tin oxide is placed on the surface of transparent and insulated glass or plastic can also be used as a working electrode. If EDOT is used as a monomer, a transparent electrode with a transparent PEDOT film can be obtained by using the transparent substrate. As a counter electrode, a plate made of platinum and nickel and the like can be used.

Electrolytic polymerization is performed using the polymerization liquid of the present invention by any one of a potentiostatic method, a galvanostatic method or a potential sweep method. In the case of the potentiostatic method, a potential of 1.0 to 1.5 V for a saturated calomel electrode is preferable though this depends on the type of monomer; and in the case of the galvanostatic method, a current value of 1 to 10000 to/cm$^2$ is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. By electrolytic polymerization, a conductive polymer film is formed on the substrate preferably at a thickness of 0.001 to 50 m. The polymerization temperature has no strict restriction, but generally it is in a range of 10 to 60° C. The polymerization time is generally in a range of 0.6 seconds to 10 hours.

To obtain an extremely transparent PEDOT film, it is preferable to perform galvanostatic polymerization at a current value of 5 to 500 µA/cm$^2$, and preferably at 10 to 100 µA/cm$^2$, for 0.6 to 120 seconds and preferably for 6 to 60 seconds. By the electrolytic polymerization under the condition, a PEDOT film with extremely high transparence at a thickness of 0.001 to 0.05 m, and preferably of 0.003 to 0.035 µm is obtained.

By washing with a medium such as water and ethanol and drying the conductive polymer film after the electrolytic polymerization, the conductive polymer film with high conductivity and excellent heat resistance can be obtained on the substrate. As the conductive polymer film of the present invention has high adhesion properties to the substrate, it can be used while placed on the substrate, and the relatively thick conductive polymer film can be used while separated from the substrate.

When the abovementioned transparent substrate is used as a substrate and a transparent PEDOT film is formed on the substrate, a transparent electrode with excellent heat resistance, high conductivity and electrochemical capacity can be obtained while placed on the substrate, and this transparent electrode can be suitably used as a component of various electronic devices such as organic electroluminescence devices and touch panel displays. Also, the PEDOT film can be separated from the substrate to form a conductive transparent film, which can be suitably used as a self-supporting and flexible transparent electrode and by attaching the highly transparent PEDOT film on an insulating plastic tray and plastic sheet, static charge can be prevented without affecting the appearance of these devices.

(b) First Form of Solid Electrolytic Capacitor

In the manufacture of the first form of solid electrolytic capacitor of the present invention comprising a positive electrode composed of a valve metal foil with an oxide film on the surface and a conductive polymer layer located on the positive electrode, a positive electrode is used where etching treatment is given to a valve metal foil such as aluminum foil, tantalum foil, niobium foil and titanium foil, and preferably aluminum foil, by a chemical or electrochemical method so that its surface is enlarged, and then a chemical conversion treatment is applied by using an ammonium adipate aqueous solution or an ammonium phosphate aqueous solution so that an oxide film is formed on the surface of the valve metal foil.

The conductive polymer layer can be directly formed on the oxide film of the positive electrode by using the leakage current of the oxide film of the positive electrode, or the conductive film can be placed on the oxide film in advance and the conductive polymer layer can be formed thereon.

For example, an oxygen film of the positive electrode can be placed in contact with a corrosive gas such as halogen gas or a corrosive liquid such as an acid aqueous solution, and an electrical micro defect is formed in the oxide film, and then the conductive polymer layer can be formed, or an oxide film of a positive electrode can be immersed into a manganese nitrate aqueous solution and pyrolyzed at a temperature of 300 to 400° C., and a manganese oxide layer is formed on the surface of the oxide film, and then the conductive polymer layer can be formed, but in light of the stability of the oxide film and the polymerization efficiency of the conductive polymer, it is preferable to place a chemical polymerization film of the abovementioned monomer on the oxide film and form the conductive polymer layer on the chemical polymerization film.

The chemical polymerized film can be formed by a method to prepare a solution where both the monomer and an oxidant are dissolved into a solvent such as water, methanol, ethanol, isopropanol, butanol or acetonitrile, apply this solution on the oxide film of the positive electrode by a process such as brush application, drop application, immersion application or spray application, and dry the oxide film, or by a method to prepare a solution where the monomer is dissolved in a solvent such as water, methanol, ethanol, isopropanol, butanol or acetonitrile and a solution where an oxidant is dissolved in a solvent such as water, methanol, ethanol, isopropanol, butanol or acetonitrile, apply these solutions alternately on the oxide film of the positive electrode by a process such as brush application, drop application, immersion application or spray application, and dry the oxide film. As the oxidant, a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate can be used; a single compound can be used, or two or more kinds of compound can be used.

Then, the positive electrode, where conductivity is given to the oxide film, is introduced, together with a counter electrode, into the polymerization liquid of the present invention and electrolytic polymerization is performed. As the counter electrode for electrolytic polymerization, a platinum plate, a nickel plate and the like can be used.

Electrolytic polymerization is performed by any one of a potentiostatic method, a galvanostatic method or a potential sweep method. In the case of the potentiostatic method, a potential of 1.0 to 1.5 V for a saturated calomel electrode is preferable though this depends on the type of monomer; and in the case of the galvanostatic method, a current value of 1 to 10000 $\mu A/cm^2$ is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. The polymerization temperature has no strict restriction, but generally it is in a range of 10 to 60° C. The polymerization time is generally in a range of 1 minute to 10 hours.

The conductive polymer layer formed on the positive electrode is washed by a medium such as water or ethanol and dried, and then a conductive layer (an apparent negative electrode) is formed on the conductive polymer layer by a conductive paste such as carbon paste or silver paste, and the first form of solid electrolytic capacitor with excellent heat resistance can be obtained.

(c) Second Form of Solid Electrolytic Capacitor

In the manufacture of the second form of solid electrolytic capacitor comprising a positive electrode that is composed of a valve metal foil with an oxide film on the surface, a negative electrode that is composed of a valve metal foil, and a separator between the positive electrode and negative electrode that holds a conductive polymer layer, prior to electrolytic polymerization, a capacitor element comprising a positive electrode that is composed of a valve metal foil with an oxide film on the surface, a negative electrode that is composed of a valve metal foil, and a separator placed between the positive electrode and the negative electrode, is formed.

As with the positive electrode of the first form of solid electrolytic capacitor, a positive electrode is used where etching treatment is given to a valve metal foil such as aluminum foil, tantalum foil, niobium foil and titanium foil, and preferably aluminum foil, by a chemical or electrochemical method so that its surface is enlarged, and then a chemical conversion treatment is applied by using an ammonium adipate aqueous solution or an ammonium phosphate aqueous solution so that an oxide film is formed on the surface of the valve metal foil. A negative electrode is used where etching treatment is given to a valve metal foil such as aluminum foil, tantalum foil, niobium foil or titanium foil, and preferably aluminum foil, by a chemical or electrochemical method so that its surface is enlarged. As the separator, Manila paper, Kraft paper, synthetic fiber paper, glass paper, a mixed paper of glass paper and Manila paper or Kraft paper can be used among others.

The positive electrode and the negative electrode are wound or layered through the separator to obtain the capacitor element. Then, a solution where both the monomer and an oxidant are dissolved in a solvent such as water, methanol, ethanol, isopropanol, butanol or acetonitrile is prepared, and the capacitor element is immersed into this solution and then heated and dried so that a chemical polymerized film is formed on the surface of the positive electrode and the surface of the negative electrode. As the oxidant, a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate can be used; a single compound can be used, or two or more kinds of compound can be used.

The capacitor element is washed by a medium such as water and ethanol and dried, and then is introduced into the polymerization liquid of the present invention and electrolytic polymerization is performed.

Electrolytic polymerization is performed using the polymerization liquid of the present invention by any one of a potentiostatic method, a galvanostatic method or a potential sweep method. In the case of the potentiostatic method, a potential of 1.0 to 1.5 V for a saturated calomel electrode is preferable though this depends on the type of monomer; and in the case of the galvanostatic method, a current value of 1 to 10000 $\mu A/cm^2$ is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. The polymerization temperature has no strict restriction, but generally it is in a range of 10 to 60° C. The polymerization time is generally in a range of 1 minute to 10 hours.

After electrolytic polymerization, by washing the conductive polymer layer, which is held by the separator, with a medium such as water and ethanol and drying it, the second form of solid electrolytic capacitor can be obtained with excellent heat resistance.

The first solid electrolytic capacitor and the second solid electrolytic capacitor in the present invention have a lowered ESR and excellent heat resistance.

EXAMPLES

The examples of the present invention are shown as follows, but the present invention is not limited to the following examples.

(1) Effect of Surfactant (a) Manufacture of Polymerization Liquid

Example 1

50 mL of distilled water was introduced into a glass container, and to this fluid, 0.4% by mass of 2,4,7,9-tetramethyl-5-decyne-4,7-diol as an acetylenol nonionic surfactant and 1.0% by mass of branched polyoxyethylene (9) nonylphenyl ether as a water-soluble nonionic surfactant were added, and then 0.57 g of EDOT (concentration: 0.08M), 0.35 g of p-nitrophenol (concentration: 0.05M) and 1.08 g of ammonium borodisalicylate (concentration: 0.08M) were added, after which the mixture obtained was evenly stirred and a polymerization liquid was obtained. The aforementioned amount of the monomer is equal to almost the maximum amount of monomer that can be emulsified with the aqueous fluid containing the surfactant.

Comparative Example 1

50 mL of distilled water was introduced into a glass container, and to this fluid, 0.4% by mass of 2,4,7,9-tetramethyl-5-decyne-4,7-diol was added, and then 0.18 g of EDOT (concentration: 0.25M), 0.35 g of p-nitrophenol (concentration: 0.05M) and 1.08 g of ammonium borodisalicylate (concentration: 0.08M) were added, after which the mixture obtained was evenly stirred and a polymerization liquid was obtained. The aforementioned amount of the monomer is equal to almost the maximum amount of monomer that can be emulsified with the aqueous fluid containing the surfactant.

Comparative Example 2

50 mL of distilled water was introduced into a glass container, and to this fluid, 1.0% by mass of branched polyoxyethylene (9) nonylphenyl ether was added, and then 0.21 g of EDOT (concentration: 0.03M), 0.35 g of p-nitrophenol (concentration: 0.05M) and 1.08 g of ammonium borodisalicylate (concentration: 0.08M) were added, after which the mixture obtained was evenly stirred and a polymerization liquid was obtained. The aforementioned amount of the monomer is equal to almost the maximum amount of monomer that can be emulsified with the aqueous fluid containing the surfactant.

Comparative Example 3

50 mL of distilled water was introduced into a glass container, and to this fluid, 0.104 g of EDOT (concentration: 0.0147 M) was added, and then the mixture obtained was stirred for 60 minutes at 25° C., and a solution where the total amount of EDOT was dissolved into water was obtained. To this solution, 0.35 g of p-nitrophenol (concentration: 0.05M) and 1.08 g of ammonium borodisalicylate (concentration: 0.08M) were added in this order, and then the mixture obtained was evenly stirred and a polymerization liquid was obtained.

Comparative Example 4

50 mL of distilled water was introduced into a glass container, and to this fluid, 2.7% by mass of sodium butylnaphthalene sulfonate as an anionic surfactant was added, and then 0.21 g of EDOT (concentration: 0.03M) was added, after which the mixture obtained was evenly stirred and a polymerization liquid was obtained. The aforementioned amount of the monomer is equal to almost the maximum amount of monomer that can be emulsified with the aqueous fluid containing the surfactant.

As can be seen from Example 1 and Comparative Examples 1 to 3, the increase in the amount of EDOT contained in the polymerization liquid due to the action of 0.4% by mass of 2,4,7,9-tetramethyl-5-decyne-4,7-diol is 0.0103M=0.025-0.0147, and the increase in the amount of EDOT contained in the polymerization liquid due to the action of 1.0% by mass of branched polyoxyethylene (9) nonylphenyl ether is 0.0153M=0.03-0.0147. On the other hand, the increase in the amount of EDOT contained in the polymerization liquid due to the action of 0.4% by mass of 2,4,7,9-tetramethyl-5-decyne-4,7-diol and 1.0% by mass of branched polyoxyethylene (9) nonylphenyl ether is 0.0653M=0.08-0.0147, which is more than 2.5 times that of the total amount (0.0256M=0.0103+0.0153) of the increase by the action of 0.4% by mass of 2,4,7,9-tetramethyl-5-decyne-4,7-diol and the increase by the action of 1.0% by mass of branched polyoxyethylene (9) nonylphenyl ether. Therefore, it is found that by a synergetic effect of 2,4,7,9-tetramethyl-5-decyne-4,7-diol and branched polyoxyethylene (9) nonylphenyl ether, the amount of EDOT contained in the polymerization liquid was substantially increased.

The increase in the amount of EDOT contained in the polymerization liquid by the action of 2.7% by mass of sodium butylnaphthalene sulfonate was almost the same as the increase in the amount of EDOT contained in the polymerization liquid by the action of 1.0% by mass of branched polyoxyethylene (9) nonylphenyl ether. Therefore, it is found that a significant increase in the amount of EDOT contained in the polymerization liquid was not achieved by this anion surfactant.

(b) Manufacture and Evaluation of a Solid Electrolytic Capacitor

Example 2

The etched aluminum foil was subjected to a formation treatment to obtain a oxide film with pressure resistance of 3V and was punched into a positive electrode with a projected area of 1×1 cm$^2$. This positive electrode was immersed into 20% by mass of an ethanol solution containing EDOT and dried at room temperature. Then, the positive electrode was immersed in an ethanol solution that contained iron (III) paratoluenesulfonate as an oxidant at a concentration of 20% by mass, dried for 10 minutes at room temperature, and given high-temperature treatment. This chemical oxidation polymerization process was then repeated and a chemical polymerized film of PEDOT was formed on the oxide film of the positive electrode. A re-formation treatment was given to the thus obtained positive electrode with a chemical polymerization film of PEDOT in an ammonium adipate aqueous solution, and the positive electrode was then water-washed and dried.

In the polymerization liquid of Example 1, the positive electrode with a chemical polymerization film of PEDOT was used as a working electrode, a Pt foil with an area of 4×4 cm² was used as a counter electrode, and a silver-silver chloride electrode was used as a reference electrode, and galvanostatic electropolymerization was implemented for 30 minutes under the condition of 1 mA/cm². The film after polymerization was cleaned with ethanol, water-washed and dried. Lastly, graphite paste was applied to the electropolymerization layer of PEDOT and dried, and then silver paste was applied and dried, so that a solid electrolytic capacitor with the positive electrode with 3 V film pressure resistance was obtained.

Comparative Example 5

The polymerization liquid of Comparative Example 1 was used instead of the polymerization liquid of Example 1, and the procedure of Example 2 was repeated.

Comparative Example 6

The polymerization liquid of Comparative Example 2 was used instead of the polymerization liquid of Example 1, and the procedure of Example 2 was repeated.

Comparative Example 7

The polymerization liquid of Comparative Example 3 was used instead of the polymerization liquid of Example 1, and the procedure of Example 2 was repeated.

Comparative Example 8

The polymerization liquid of Comparative Example 4 was used instead of the polymerization liquid of Example 1, and the procedure of Example 2 was repeated.

The real-capacitance recovery values at 120 Hz and the ESR values at 100 kHz of the capacitors in Example 2 and Comparative Examples 5 to 8 were measured. Then, thermal aging was performed in air at 150° C. for 200 hours and for 600 hours, and the change in ESR was investigated. The result is shown in Table 1. Here "real-capacitance recovery" means the capacitance recovery calculated based on the capacitance of the oxide film after forming the chemical polymerization film and the electrolytic polymerization layer of PEDOT. Also, "thermal aging" means heating at a predetermined temperature for a predetermined time.

The solid electrolytic capacitors in Example 2 and Comparative Examples 5, 6 and 8, which were manufactured with the polymerization liquid containing nonionic surfactant or anion surfactant, exhibited a higher real-capacitance recovery than the solid electrolytic capacitor in Comparative Example 7, which was manufactured with the polymerization liquid without surfactant. This was considered to be because electrolytic polymerization rapidly proceeded as the monomer was condensed in the micelle of the surfactant and the conductive polymer layer was evenly formed even in the inside of the etching pits of the oxide film of the anode foil.

Also, the solid electrolytic capacitors in Example 2 and Comparative Examples 5 and 6, which were manufactured with the polymerization liquid containing nonionic surfactant, exhibited a remarkably lower ESR than the solid electrolytic capacitor in Comparative Example 7, which was manufactured with the polymerization liquid without nonionic surfactant. On the other hand, the ESR of the solid electrolytic capacitor in Comparative Example 8, which was manufactured with the polymerization liquid containing anion surfactant, was higher than the ESRs of the capacitors in Example 2 and Comparative Examples 5 and 6, though it was lower than the ESR of the solid electrolytic capacitor in Comparative Example 7, which was manufactured with a polymerization liquid without nonionic surfactant. Therefore, it was concluded that electrolytic polymerization rapidly proceeded because the monomer was condensed in the micelle of the nonionic surfactant or anion surfactant and the conductive polymer layer that was dense and highly conductive was obtained, but a dopant produced from ammonium borodisalicylate (a borodisalicylate ion) had the larger effect of improving the conductivity of the conductive polymer layer than a dopant produced from sodium butylnaphthalene sulfonate as anionic surfactant (a butylnaphthalenesulfonate ion). Also, it was concluded that the low ESR of the solid electrolytic capacitors was achieved because the nonionic surfactants did not adversely affect the doping by a borodisalicylate ion.

The solid electrolytic capacitor of Example 2 manufactured with the polymerization liquid having remarkably increased monomer concentration showed the lowest ESR and the highest real-capacitance recovery. This was considered to be because the amount of monomer contained in the polymerization liquid was increased remarkably by the use of the composite nonionic surfactant so that a conductive polymer layer that was especially even and dense, and had an especially high conductivity, was obtained.

TABLE 1 characteristic evaluation of a solid electrolytic capacitor

| | monomer density (mM) | capacitance recovery (%) | $ESR_0$ (mΩ) | $ESR_{200}$ (mΩ) | $ESR_{200} - ESR_0$ (mΩ) | $ESR_{600}$ (mΩ) | $ESR_{600} - ESR_0$ (mΩ) |
|---|---|---|---|---|---|---|---|
| Example 2 | 80 | 81 | 1.1 | 1.3 | 0.2 | 4 | 2.9 |
| Comparative Example 5 | 25 | 78 | 1.4 | 1.7 | 0.3 | 8 | 6.6 |
| Comparative Example 6 | 30 | 78 | 1.2 | 1.4 | 0.2 | 7 | 5.8 |
| Comparative Example 7 | 14.7 | 76 | 3 | 3.5 | 0.5 | 18 | 15 |
| Comparative Example 8 | 30 | 78 | 2 | 3.8 | 1.8 | 40 | 38 |

ESR: initial ESR
$ESR_{200}$: ESR after 200 hours of thermal aging
$ESR_{600}$: ESR after 600 hours of thermal aging In the heat resistance test, the solid electrolytic capacitor of Comparative Example 8, which was manufactured with the polymerization liquid containing anion surfactant, showed a lower heat resistance than the solid electrolytic capacitor of Comparative Example 7, which was manufactured with a polymerization liquid without nonionic surfactant. This is because a dopant produced from ammonium borodisalicylate (a borodisalicylate ion) has a larger effect in terms of improving the heat resistance of the conductive polymer layer than a dopant produced from sodium butylnaphthalene sulfonate as anionic surfactant (butylnaphthalenesulfonate ion).

On the other hand, in a heat resistance test of 200 hours, the solid electrolytic capacitors of Example 2 and Comparative Examples 5 and 6, which were manufactured with the polymerization liquid containing nonionic surfactant, exhibited a more excellent heat resistance than the solid electrolytic capacitor of Comparative Example 7, which was manufactured with the polymerization liquid without nonionic surfactant. This was considered to be because complex formation with p-nitrophenol and a borodisalicylate ion was not inhibited by the nonionic surfactants, and doping of the borodisalicylate anion to the conductive polymer layer was not inhibited. Also, it was considered to be because a dense conductive polymer layer with excellent heat resistance was obtained as the amount of monomer contained in the polymerization liquid was increased by the nonionic surfactants.

In the heat resistance test of 600 hours, the solid electrolytic capacitor of Example 2, which was manufactured with the polymerization liquid containing the composite nonionic surfactant composed of 2,4,7,9-tetramethyl-5-decyne-4,7-diol and branched polyoxyethylene (9) nonylphenyl ether, exhibited a remarkably improved heat resistance compared with the solid electrolytic capacitors of Comparative Examples 5 and 6, which were manufactured with a polymerization liquid containing only either one of 2,4,7,9-tetramethyl-5-decyne-4,7-diol or branched polyoxyethylene (9) nonylphenyl ether. This was considered to be because a conductive polymer layer that was especially dense and even, and therefore had especially good heat resistance, was formed by the action of the composite nonionic surfactant.

(2) The Influence of Water Content in Water-Rich Solvent (a) Manufacture of Polymerization Liquid Example 3

50 mL of a mixed solvent, in which distilled water and ethanol were mixed at the ratio of 95:5, was introduced into a glass container, and 0.4% by mass of 2,4,7,9-tetramethyl-5-decyne-4,7-diol as an acetylenol nonionic surfactant and 1.0% by mass of branched polyoxyethylene (9) nonylphenyl ether as a water-soluble nonionic surfactant were added, and then 0.57 g of EDOT (concentration: 0.08M), 0.35 g of p-nitrophenol (concentration: 0.05M) and 1.08 g of ammonium borodisalicylate (concentration: 0.08M) were added, after which the mixture obtained was stirred evenly and a polymerization liquid was obtained.

Example 4

50 mL of a mixed solvent, in which distilled water and ethanol were mixed at the ratio of 80:20, was introduced into a glass container, and 0.4% by mass of 2,4,7,9-tetramethyl-5-decyne-4,7-diol as an acetylenol nonionic surfactant and 1.0% by mass of branched polyoxyethylene (9) nonylphenyl ether as a water-soluble nonionic surfactant were added, and then 0.57 g of EDOT (concentration: 0.08M), 0.35 g of p-nitrophenol (concentration: 0.05M) and 1.08 g of ammonium borodisalicylate (concentration: 0.08M) were added, after which the mixture obtained was stirred evenly and a polymerization liquid was obtained.

(b) Manufacture and Evaluation of a Solid Electrolytic Capacitor

Example 5

The polymerization liquid in Example 3 was used instead of the polymerization liquid of Example 1, and the procedure of Example 2 was repeated.

Example 6

The polymerization liquid in Example 4 was used instead of the polymerization liquid of Example 1, and the procedure of Example 2 was repeated.

For the capacitors of Examples 2, 5, and 6, ESR ($ESR_0$) at 100 kHz was evaluated, and then thermal aging was performed in air at 150° C. for 150 hours, and after the thermal aging, ESR ($ESR_{150}$) at 100 kHz was evaluated again. The ESR values before and after the thermal aging are shown in Table 2.

TABLE 2

| characteristic evaluation of a solid electrolytic capacitor | | | |
|---|---|---|---|
| | solvent composition water:ethanol | $ESR_0$ (mΩ) | $ESR_{150}$ (mΩ) |
| Example 2 | 100:0 | 1.1 | 1.2 |
| Example 5 | 95:5 | 1.4 | 1.6 |
| Example 6 | 80:20 | 1.8 | 2.1 |

The results in Table 2 show that a capacitor with excellent heat resistance can be obtained as the water content in the water-rich solvent increases.

INDUSTRIAL APPLICABILITY

The conductive polymer obtained from the polymerization liquid of the present invention is applied to a solid electrolytic capacitor and other various areas including a polymer battery, an antistatic film, an indicating element, a sensor, and an electrode material.

What is claimed is:
1. A polymerization liquid for electrolytic polymerization of at least one monomer with a π-conjugated double bond, comprising:
   a solvent composed of 100 to 80% by mass of water and 0 to 20% by mass of an organic solvent;
   at least one supporting electrolyte;
   a composite nonionic surfactant composed of:
     at least one acetylenol surfactant of the formula (1):

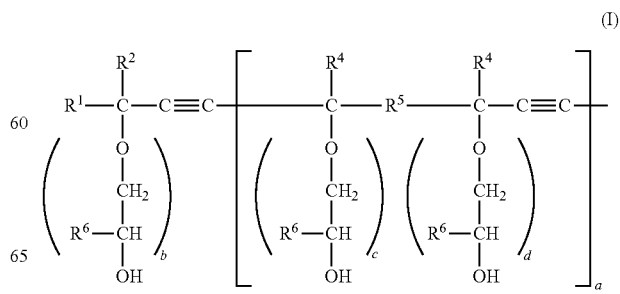

-continued

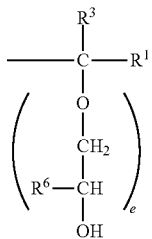

where a is 0 or 1,
b is an integer number of 0, 1 or more than 1,
c is an integer number of 0, 1 or more than 1,
d is an integer number of 0, 1 or more than 1, and
e is an integer number of 0, 1 or more than 1,
provided that $0 \leq b+e \leq 100$ and $0 \leq c+d \leq 100$;
$R^1$ is hydrogen or methyl group,
$R^2$, $R^3$ and $R^4$ may be the same or different and are independently linear or branched alkyl or alkenyl groups having 1 to 8 carbon atoms,
$R^5$ is a linear or branched alkylene or alkenylene group having 1 to 4 carbon atoms, and
$R^6$ is hydrogen, methyl or ethyl group; and
at least one water-soluble nonionic surfactant other than the acetylenol surfactant; and
the monomer emulsified with the solvent by the composite nonionic surfactant.

2. The polymerization liquid according to claim 1, wherein a in the formula (I) is 0.

3. The polymerization liquid according to claim 2, wherein the acetylenol surfactant of the formula (I) is 2,4,7,9-tetramethyl-5-decyne-4,7-diol.

4. The polymerization liquid according to claim 1, wherein the water-soluble nonionic surfactant other than the acetylenol nonionic surfactant is at least one compound selected from a group consisting of polyoxyethylene alkylphenyl ethers.

5. The polymerization liquid according to claim 3, wherein the water-soluble nonionic surfactant other than the acetylenol nonionic surfactant is at least one compound selected from a group consisting of polyoxyethylene alkylphenyl ethers.

6. The polymerization liquid according to claim 1, wherein the solvent consists of water only.

7. The polymerization liquid according to claim 1, wherein the monomer is at least one compound selected from a group consisting of 3,4-disubstituted thiophenes.

8. The polymerization liquid according to claim 5, wherein the monomer is at least one compound selected from a group consisting of 3,4-disubstituted thiophenes.

9. The polymerization liquid according to claim 1, wherein the supporting electrolyte is at least one compound selected from a group consisting of organic non-sulfonate supporting electrolytes having an anion with the molecular weight of 200 or more.

10. The polymerization liquid according to claim 9, wherein the supporting electrolyte is at least one compound selected from a group consisting of borodisalicylic acid and borodisalicylic salts.

11. The polymerization liquid according to claim 10, further comprising at least one stabilizer selected from a group consisting of nitrobenzene and nitrobenzene derivatives.

12. The polymerization liquid according to claim 8, wherein the supporting electrolyte is at least one compound selected from a group consisting of borodisalicylic acid and borodisalicylic salts.

13. The polymerization liquid according to claim 12, further comprising at least one stabilizer selected from a group consisting of nitrobenzene and nitrobenzene derivatives.

14. A conductive polymer film obtained by introducing a substrate with a conductive part at least on the surface into the polymerization liquid according to claim 1 and performing electrolytic polymerization.

15. A solid electrolytic capacitor comprising: a positive electrode composed of a valve metal foil with an oxide film on the surface; and a conductive polymer layer located on the positive electrode, wherein the conductive polymer layer is formed by introducing the positive electrode into the polymerization liquid according to claim 1 and performing electrolytic polymerization.

16. A solid electrolytic capacitor comprising: a positive electrode composed of a valve metal foil with an oxide film on the surface; a negative electrode composed of a valve metal foil; and a separator having a conductive polymer layer between the positive electrode and the negative electrode, wherein the conductive polymer layer is formed by introducing a capacitor element with the positive electrode, the negative electrode, and a separator between the positive electrode and the negative electrode into a polymerization liquid according to claim 1, thereby immersing the polymerization liquid into the capacitor element, and performing electrolytic polymerization.

17. A solid electrolytic capacitor comprising: a positive electrode composed of a valve metal foil with an oxide film on the surface; and a conductive polymer layer located on the positive electrode, wherein the conductive polymer layer is formed by introducing the positive electrode into the polymerization liquid according to claim 8 and performing electrolytic polymerization.

18. A solid electrolytic capacitor comprising: a positive electrode composed of a valve metal foil with an oxide film on the surface; a negative electrode composed of a valve metal foil; and a separator having a conductive polymer layer between the positive electrode and the negative electrode, wherein the conductive polymer layer is formed by introducing a capacitor element with the positive electrode, the negative electrode, and a separator between the positive electrode and the negative electrode into a polymerization liquid according to claim 8, thereby immersing the polymerization liquid into the capacitor element, and performing electrolytic polymerization.

19. A solid electrolytic capacitor comprising: a positive electrode composed of a valve metal foil with an oxide film on the surface; and a conductive polymer layer located on the positive electrode, wherein the conductive polymer layer is formed by introducing the positive electrode into the polymerization liquid according to claim 13 and performing electrolytic polymerization.

20. A solid electrolytic capacitor comprising: a positive electrode composed of a valve metal foil with an oxide film on the surface; a negative electrode composed of a valve metal foil; and a separator having a conductive polymer layer between the positive electrode and the negative electrode, wherein the conductive polymer layer is formed by introducing a capacitor element with the positive electrode, the negative electrode, and a separator between the positive electrode and the negative electrode into a polymerization liquid according to claim 13, thereby immersing the polymerization liquid into the capacitor element, and performing electrolytic polymerization.

\* \* \* \* \*